(No Model.) 2 Sheets—Sheet 1.
J. JENKINS.
SAFETY PIN MACHINE.
No. 349,224. Patented Sept. 14, 1886.
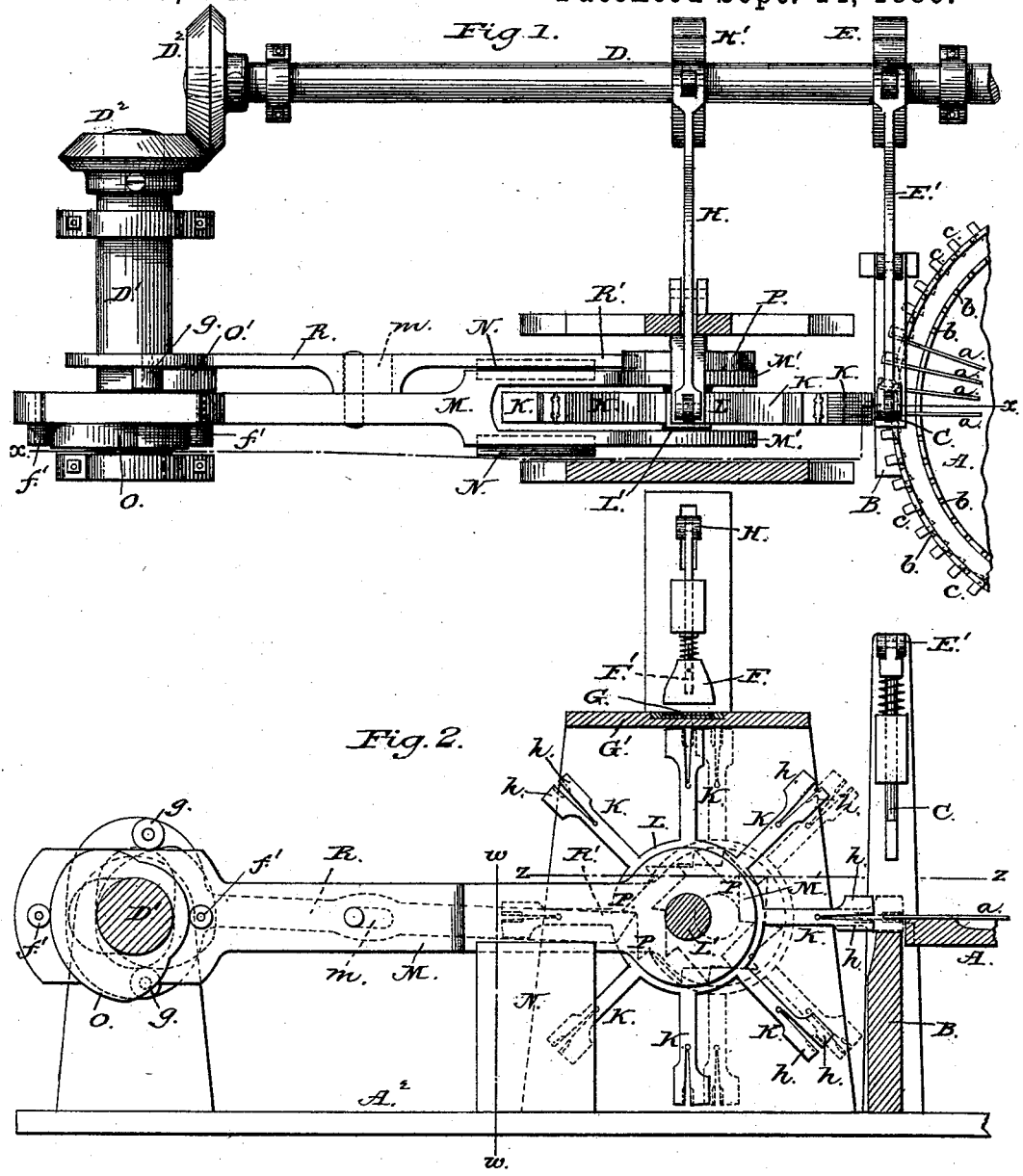
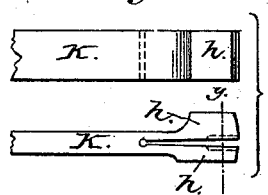
Attest:
John A. Ellis
John F. Acker
Inventor:
Joel Jenkins
By David A. Burr
Atty.

(No Model.) 2 Sheets—Sheet 2.
J. JENKINS.
SAFETY PIN MACHINE.
No. 349,224. Patented Sept. 14, 1886.
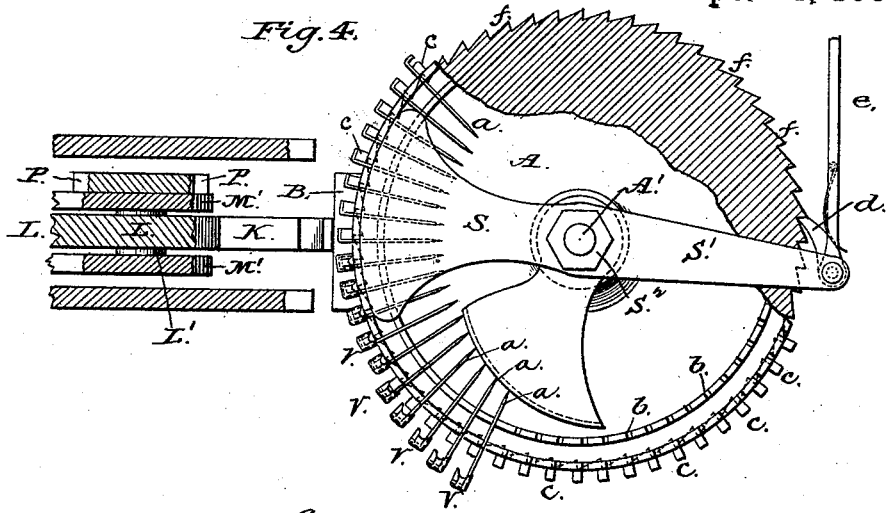
Fig. 4.
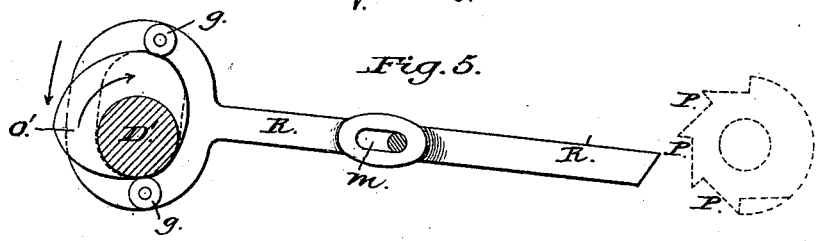
Fig. 5.
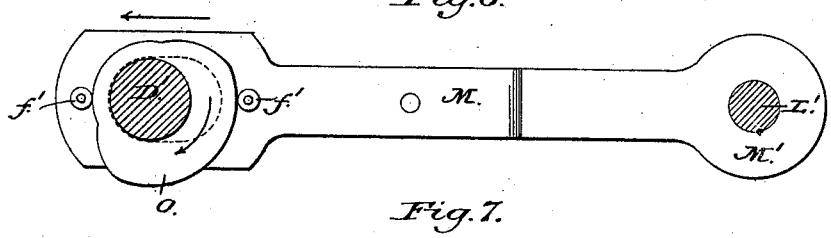
Fig. 6.
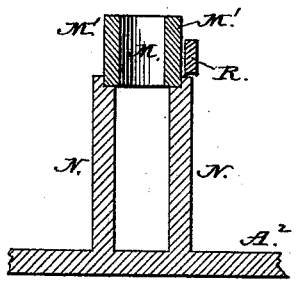
Fig. 7.
Fig. 8.
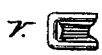
Attest:
John A. Ellis
John F. Acker
Inventor:
Joel Jenkins
By David A. Burr
Atty.

United States Patent Office.

JOEL JENKINS, OF MONTCLAIR, NEW JERSEY.

SAFETY-PIN MACHINE.

SPECIFICATION forming part of Letters Patent No. 349,224, dated September 14, 1886.

Application filed March 6, 1886. Serial No. 194,346. (No model.)

*To all whom it may concern:*

Be it known that I, JOEL JENKINS, of Montclair, in the county of Essex and State of New Jersey, have invented a new and useful Improvement in Safety-Pin Machines; and I do hereby declare that the following is a full and exact description thereof, reference being had to the accompanying drawings, and to the letters of reference marked thereon, making a part of this specification, in which—

Figure 1 is a plan view of my improved safety-pin-heading machine with a portion only of the conveying-wheel in view; Fig. 2, an irregular vertical section in line $x\ x$ of Fig. 1; Fig. 3, details, on an enlarged scale, of the end of one of the heading-arms, giving a plan and a side elevation thereof; Fig. 3*, a transverse section in line $y\ y$ of Fig. 3; Fig. 4, a horizontal section in line $z\ z$ of Fig. 2, embracing a plan view of the entire conveying-wheel with a portion thereof broken away and in horizontal section; Fig. 5, a side elevation, on an enlarged scale, of the pawl-lever actuating the heading-arms detached, its cam-shaft and pivot-pin being in section; Fig. 6, a similar elevation of the forked reciprocating bar, in which the heading-arms are journaled, its cam-shaft and the axis of the arms being in section. Fig. 7 is a transverse section in line $w\ w$ of Fig. 2; and Fig. 8, a detached plan, on an enlarged scale, of one of the heads or shields to be attached to the pins.

My invention relates to machines for manufacturing safety-pins, and more especially to the devices for fitting and securing the point-protecting heads or shields upon the pin-blanks.

It has for its object to simplify the heading of the pins; and it consists in the construction and combination of mechanism, as hereinafter described, to accomplish this purpose.

In the accompanying drawings, A represents the device for conveying the wire blanks for the pins to the anvil B, Figs. 1 and 2, whereon the heads or shields are to be clamped upon the blanks by means of a reciprocating plunger, C, playing vertically above the anvil. The conveying device, as shown in the drawings, Figs. 1, 2, and 4, consists of a horizontal wheel, A, rotating upon a vertical spindle, A', and which is provided with radial seats $b\ b$ upon its rim to receive the wire blanks $a\ a$. These blanks $a\ a$ consist of bits of wire of suitable length pointed at one end and bent at the other to a right angle, (see Fig. 4,) and they are placed each in one of the radial seats, with its bent end projecting outwardly and resting against a lug, $c$, projecting from the rim of the wheel. A plate, S, made fast to the top of the axial spindle of the wheel, projects therefrom to bear upon the blanks $a\ a$ as they approach and pass the anvil, so as to hold them firmly in their seats while the heads are being fitted and secured thereon over the anvil.

An intermitting rotary movement is imparted to the wheel A from the main shaft D (see Fig. 4) by means of a pawl, $d$, upon a reciprocating rod, $e$, actuated by an eccentric (not shown in the drawings) upon the main shaft D (see Fig. 4) in the customary manner, the pawl $d$ being made to engage a series of ratchet-teeth, $f\ f$, on the rim of the wheel A. (See Fig. 4.) An arm, S', projects radially from the clamping-plate S to the end of the reciprocating pawl-bar $e$, (see Fig. 4,) and is pivoted thereto, so that the plate S will move in unison with the wheel, and will be carried back independently thereof at the end of each of its movements. I contemplate other well-known devices for producing an intermittent movement of the wheel A.

The pressure of the plate S upon the blanks is rendered elastic by the elasticity of the plate, and is controlled by the nut $S^2$, which fastens the end of the plate down upon the top of the spindle A'.

The blanks $a\ a$ are brought successively over the fixed anvil B by the intermittent movement of the wheel A into position to receive a head or shield, V, (see Fig. 8,) and to have the head clamped and fixed thereon by the operation of the plunger C, Fig. 2, as hereinafter described. The vertically-reciprocating movement of the plunger C is obtained from the main shaft D by means of a cam-wheel, E, on said shaft actuating one end of a pivoted horizontal lever, E', of the first order, whose opposite end is attached to the upper end of the plunger, or by other known devices for the purpose. These devices for carrying the blanks to the anvil and for closing and clamping a head thereon are more fully described in an application for Letters Patent filed concurrently herewith, Serial No. 184,017. I contemplate, however, substituting therefor other known devices for bringing the wire blanks into position over the anvil to receive the head, and for compressing and clamping the head upon the blank after it has been fitted thereon.

The detached heads or shields V for the pins, (see Fig. 8,) may be produced by means of reciprocating punches F F', (see Fig. 2,) operating to cut out a blank from a suitable thin metal strip, and to force said blank through a shaping-die, G, in manner as is described and illustrated in my pending application for Letters Patent, Serial No. 192,644, and which it is not necessary herein more fully to describe, or in any other suitable manner. When produced by punches F F', these punches may be mounted to operate synchronously with the heading device C, so as to form and deliver a head or shield as required to each heading-arm, and in such case the punches are actuated by a lever, H, operated by a cam-wheel, H', on the main shaft D of the machine. Otherwise the detached heads or shields may be supplied to the heading-arms through a suitable feed-tube in any well-known manner.

K K represent a series of heading-arms mounted radially at equal distances apart to project as spokes from a central hub, L, fixed upon an axial shaft or rod, L', rotating in journal-bearings formed in the forked end M' of a horizontally-reciprocating bar, M. This forked bar M is mounted to slide freely in horizontal ways formed in pedestals N N (see Figs. 2 and 7) upon the base-plate $A^2$ of the machine, and the axial shaft L' is carried thereby under the opening in the table G', through which the detached heads are delivered, and by the reciprocating movement of the bar is carried from said point forward and back a distance slightly greater than the length of the head. (See dotted lines, Fig. 2.) The outer end of this bearing-bar M is slotted, (see dotted lines, Figs. 2 and 6,) to embrace the shaft D', mounted in suitable bearings over the bed-plate $A^2$, and is geared by bevel-gears $D^2$ $D^2$ to the main shaft D, (see Fig. 1,) and its reciprocation is produced by means of friction-rollers $f'$ $f'$ upon stud-pins projecting from the face of the bar to embrace between them the periphery of a cam-wheel, O, secured upon said shaft D'.

The radial arms K K are of such a length as that in the rotation of the hub L when in position vertically under the feed-opening in the table G' they shall each pass closely under the table, and the hub L is so mounted relatively to the anvil B (see Fig. 2) as that the arms shall revolve in a vertical plane passing centrally through the anvil with their ends just clearing its edge when the hub is central under the feed-opening, and will each project immediately over the anvil to rest upon it when brought to a horizontal position and carried forward by the forward movement of the hub from under the feed-opening produced by the movement of the bearing-bar M. (See dotted lines, Fig. 2.)

The outer end of each arm K is split longitudinally in a direction parallel with the axis of the hub L, to form two jaws, h h, (see Fig. 3,) which are fashioned internally (see Fig. 3*) to serve as dies, between which an interposed head, V, (see Fig. 8,) will be fashioned and clamped as required to fit and secure it upon the bent end of one of the wire-pin blanks a when the dies are closed together. These jaws h h are normally open wide enough to receive readily between them the blank head V, so that as each arm is brought under the supply or feed opening in the table G' the blank head V, delivered through said opening either by the operation of the forming-punch F' or otherwise, will drop between the jaws in position to be carried thereby to the anvil, and by means of the longitudinal horizontal movement of the arm K be there imposed upon the bent end of the pin-blank a, brought to the anvil, and held there in readiness for this purpose by the wheel A, (see Fig. 2,) as hereinbefore described.

The arms K K are carried successively and intermittently from the supply-opening in the table G', where they receive the detached heads V, to the anvil B, where they deliver them upon the pin-blanks a by an intermittent rotation of the hub L, produced by the engagement of the end of an oscillating lever, R, (see Figs. 1 and 5,) with a series of ratchet-teeth, P P, (see Fig. 5 and dotted lines Fig. 2,) formed upon one side of the hub. This lever R is pivoted upon the side of the bar M, and its outer end is transversely slotted to embrace the shaft D', and fitted with friction-rollers g g, which, rotating upon stud-pins projecting upon its face, bear against the periphery of a cam-wheel, O', secured upon said shaft D'.

The pin upon which the pawl-lever R is pivoted extends through a longitudinal slot, m, in the lever, so as to permit of the longitudinal reciprocating movement of the bar M independently of said lever. (See dotted lines, Fig. 2.) The movement of the pawl-lever R is so adjusted as that it will operate to bring each arm successively into position, one under the feed-opening in the table G' and another simultaneously into line with the anvil B, and the cam-wheels O O' are so formed and adjusted as that so soon as the cam O' has operated to shift the arms the cam O will operate to produce a forward longitudinal movement of the bar M, (see dotted lines, Figs. 2 and 5,) allow it to remain quiet for a given interval, and then retract it preparatory to another movement of the pawl-lever. While the retracting-arms and the hub L carrying them are in their forward position the pawl end R' of the lever R drops, so that upon the return of the hub the pawl is in position to engage another ratchet-tooth brought over it into line for engagement by the return of the hub, as represented in positive and dotted lines, Fig. 2.

The movements of the conveying-wheel A and of the punch or plunger C are so adjusted with reference to those of the heading-arms K K as that a fresh blank is brought by the wheel over the anvil during the interval in which the supply to the arms and their revolution is effected, and while the wheel remains stationary the punch or plunger C first descends upon the jaws h h over the anvil, to close them upon the head or shield V, inserted between them, and thereby compress and clamp the head or shield upon the bent end of the wire blank, and is then again lifted therefrom, the bearing-bar M in the meantime moving longitudinally forward to carry the jaws and head over the blank before the plunger descends, and back again to withdraw the jaws after the plunger has moved up before the intermittent rotary movement of the wheel A again occurs. Prior to this movement a fresh blank is supplied to the vertical arm. While the jaws are upon the anvil and the ratchet-teeth upon the hub L are, by reason of the former position of the hub, clear of the pawl-lever R, the lever oscillates so as to carry its pawl end R' down, in readiness to engage the next tooth brought over it by the return of the hub to its first position. By these devices a blank head or shield is delivered into the jaws of one of the heading-arms at each movement of the machine, and by its successive movements the arm is carried from a vertical to a horizontal plane into line with the top of the anvil, then carried forward over and upon the end of a bent-wire blank previously brought into position over the anvil by the conveying-wheel, compressed and fixed upon the blank, and the jaws are thereafter withdrawn, leaving the heading-blanks free to be carried forward by the next movement of the wheel, which said movement brings another blank into position for heading by a repetition of the movements already described.

I claim as my invention—

1. The combination, with an anvil, a carrying device substantially as described, whereby the end of a wire pin-blank is brought over the anvil, and a punch or plunger reciprocating to and from the anvil at a right angle with the wire blank, of a forked bar reciprocating longitudinally in a horizontal plane to and from the anvil in a direction coincident with the length of the wire blank, mechanism, substantially as described, for producing an intermittent reciprocating movement of the bar, a series of radial arms rotating upon an axle journaled in the forked end of the reciprocating bar in the same longitudinal plane with the wire blank, and clamping-jaws at the end of said arms brought in the rotation of the arms intermittently in line horizontally with its axis, and which are carried by its longitudinal movement over the anvil to embrace the end of the wire blank under the punch or plunger, all substantially in the manner and for the purpose herein set forth.

2. In a safety-pin machine, the intermittently-rotating and horizontally-reciprocating hub, the arms radiating therefrom recessed at their outer ends to receive and carry blank heads or shields for safety-pins, an anvil over which their outer ends are successively brought to a rest and withdrawn, mechanism, substantially as described, for delivering the heads into the terminal recesses of the arms, mechanism, substantially as described, for carrying wire pin-blanks into line over the anvil to receive the heads, and a compressing punch or plunger moving over the anvil to compress and fix the heads upon the blanks when fitted thereon, all substantially in the manner and for the purpose herein set forth.

3. In a safety-pin machine, the intermittently-rotating and horizontally-reciprocating hub, the arms radiating therefrom and recessed at their outer ends to receive and carry blank heads or shields for safety-pins, an anvil over which their outer ends are successively brought to a rest and withdrawn, mechanism, substantially as described, for delivering the heads into the terminal recesses of the arms, and mechanism, substantially as described, for carrying wire pin-blanks into line over the anvil to receive the heads, all substantially in the manner and for the purpose herein set forth.

In testimony whereof I have signed my name to this specification in the presence of two subscribing witnesses.

JOEL JENKINS.

Witnesses:
J. F. ACKER, Jr.,
JOHN A. ELLIS.